United States Patent

Ryu

[11] Patent Number: 5,251,845
[45] Date of Patent: Oct. 12, 1993

[54] REEL DRIVING APPARATUS FOR TAPE RECORDER

[75] Inventor: Kye Y. Ryu, Seoul, Rep. of Korea

[73] Assignee: Goldstar Co., Ltd., Seoul, Rep. of Korea

[21] Appl. No.: 803,554

[22] Filed: Dec. 9, 1991

[30] Foreign Application Priority Data

Dec. 10, 1990 [KR] Rep. of Korea ............... 19430/1990

[51] Int. Cl.$^5$ ............................................. G11B 15/30
[52] U.S. Cl. .................................................. 242/201
[58] Field of Search ............... 242/201, 202, 205, 206, 242/208, 209; 360/96.3, 96.4

[56] References Cited

U.S. PATENT DOCUMENTS

| | | | |
|---|---|---|---|
| 4,594,624 | 6/1986 | Kanchiku et al. | 360/96.4 X |
| 4,681,281 | 7/1987 | Aarts et al. | 360/96.3 X |
| 5,044,218 | 9/1991 | Lee et al. | 242/201 X |

Primary Examiner—Daniel P. Stodola
Assistant Examiner—John P. Darling
Attorney, Agent, or Firm—Birch, Stewart, Kolasch & Birch

[57] ABSTRACT

A reel driving apparatus for use in a tape recorder such as a video cassette tape recorder, a digital audio tape recorder and the like, includes a rotary disk provided with an engaging protrusion and resiliently biased by a coil spring, an up/down bracket movable upward and downward together with the up/down bracket, and an idler gear engaging with upper and lower gears of supply and take-up clutches, selectively. By the arrangement described, the structure of deck mechanism becomes simple by using only a single idler mechanism to drive the supply reel and the take-up reel in different torques suitable for a high speed mode and low speed mode.

9 Claims, 3 Drawing Sheets

REEL DRIVING APPARATUS FOR TAPE RECORDER

BACKGROUND OF THE INVENTION

1. Field of the Invention

The present invention relates to a reel driving apparatus for use in a tape recorder such as a video cassette tape recorder, a digital audio tape recorder and the like, and more particularly to a reel driving apparatus for use in a tape recorder which can drive a supply reel and a take-up reel in a different torque by means of a single idler mechanism.

2. Description of the Prior Art

Various types of the reel driving apparatuses for use in a tape recorder are well known in the art. One conventional reel driving apparatus for use in a tape recorder is illustrated in FIGS. 1 and 2. As shown in FIGS. 1 and 2, the conventional reel driving apparatus is constituted such that a power of a direct current drive motor 1 is transmitted in different paths in case of a high speed mode such as a FF/REW mode and in case of a low speed mode such as a PLAY/UNLOADING mode. That is, in the high speed mode the power of the drive motor 1 is directly transmitted to a supply reel 4 and a take-up reel 5 through upper gears 2a and 3a of supply and take-up clutches 2 and 3, while in the low speed mode the power of the drive motor 1 is transmitted to the supply and take-up reels 4 and 5 after having been reduced in its speed through the supply and take-up clutches 2 and 3 via the lower gears 2b and 3b of the supply and take-up clutches 2 and 3.

Describing in more detail such an operation, upper and lower connecting gears 7 and 7' are rotatably mounted on a central shaft 6 which is fixed between the supply clutch 2 and the take-up clutch 3, and the connecting gears 7 and 7' are in geared relations with upper and lower idler gears 8 and 8', respectively, which are meshed with the upper and lower gears 2a, 3a and 2b, 3b of the supply and take-up clutches 2 and 3, selectively, in accordance with the rotational direction of the connecting gears 7 and 7'.

Further, a pulley 10 which is provided at its upper portion with an intermediary gear 10a meshed with the lower connecting gear 7', is mounted on a drive shaft 9 and on the upper portion of the drive shaft 9, a drive gear 11 is rotatably mounted which is provided with a small gear 11a meshed with the upper connecting gear 7.

On a shaft 12, a small gear 13 is rotatably mounted which always meshes with the drive gear 11 and on the lower side of the shaft 12, a movable gear 14 is resiliently supported by a compression coil spring 15 in a manner such that it can be moved upward and downward by an up/down movement driving unit.

In a state that the movable gear 14 is moved downward, the movable gear 14 meshes with a wheel gear 17 which is provided with a capstan shaft 16 and in case of moving upwardly by the up/down movement driving unit it is separated from the wheel gear 17. On a lower surface of the wheel gear 17, a wheel pulley 18 is integrally formed which is connected with a drive pulley 19 of the drive motor 1 by means of a belt 20, and a lower pulley 21 which is fixed on the lower end of the capstan shaft 16, is connected to the driven pulley 10 by means of a belt 22.

The up/down movement driving unit comprises a swing lever 24 which is pivotable about a hinge 23 by a function plate (not shown), and an up/down member 26 for pushing upwardly the movable gear 14 by means of a pivoting motion of the swing lever 24, which is rotatably mounted on a shaft 25.

In addition, an additional latching mechanism (not shown) with a complicated structure is provided to prevent the lower idler gear 8 from being meshed with lower gears 2b and 3b of the supply and take-up clutches 2 and 3 in a high speed mode.

The conventional reel driving apparatus is operated as follows.

When a selection key is pressed for a high speed mode, the power of the drive motor 1 is transmitted in a path of drive pulley 19→, belt 20→, wheel pulley 18, and since at this moment the up/down movement driving unit does not operate, the movable gear 14 is moved downwardly by the restoration force of the compressed coil spring 5 and then meshed with the wheel gear 17.

Accordingly, the rotational force of the wheel gear 17 is transmitted in a path of movable gear 14→small gear 13→, drive gear 11→upper connecting gear 7 and the upper idler gear 8 is meshed with the upper gears 2a and 3a of the supply and take-up clutches 2 and 3, selectively, in accordance with the rotational direction of the upper connecting gear 7 so that the rotational force of the upper connecting gear 7 is transmitted to the supply or take-up clutch 2 or 3, thereby rotating the supply or take-up reel 4 or 5 which is meshed with the clutches 2 and 3 in a high speed. At this time, the rotational force transmitted to the wheel pulley 21 is transmitted in a path of belt 22→, driven pulley 10→intermediate gear 10a→lower connecting gear 7', but since the lower idler gear 8' is held by a separate latching mechanism, it rotates idle but not swung in the left or right.

On the other hand, when a selection key for low speed mode is pressed, the swing lever 24 is rotated in a counterclockwise direction about the shaft 23 by a movement of the function plate so that the up/down member 26 pushes the movable gear 14, upwardly as shown in FIG. 2, thereby separating the movable gear 14 from the wheel gear 17. Accordingly, the rotation force of the drive motor 1 is not transmitted to the movable gear 14, and the rotational force of the wheel gear 17 is transmitted in a path of wheel pulley 21, belt 20→driven pulley 10→intermediate gear 10a, lower connecting gear 7', and in accordance with the rotational direction of the lower connecting gear 7' the lower idler gear 8' meshes with lower gear 2b or 3b of the supply and take-up reels 2 and 3, selectively. At this moment, since the latching mechanism is released in the low speed mode, the movement of the lower idler gear 8' in the left and right is not restricted.

The power transmitted to the lower gears 2b and 3b of the supply and take-up clutches 2 and 3 is changed in its torque properly by means of an ordinary speed reduction operation of the clutches so that the supply and take-up reels 2 and 3 can be rotated with a rotational force suitable for a low speed mode.

However, in such a conventional reel driving apparatus, since two pairs of idler mechanisms having different power transmitting paths are used to drive the supply and take-up reels in a torque suitable for a high speed mode and a low speed mode, respectively, there is a disadvantage in that the structure becomes complicated on the whole, resulting in the high cost and low productivity.

SUMMARY OF THE INVENTION

Accordingly, it is an object of the present invention to provide a reel driving apparatus for use in a tape recorder which is capable of driving a supply reel and a take-up reel in a different torque by a single idler mechanism.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a reel driving apparatus for use in a tape recorder which includes a rotary disk resiliently biased by means of a tensional coil spring, a rotation driving mechanism for rotating the rotary disk at a predetermined angle, an up/down bracket provided with a recess at the lower surface thereof, an up/down driving mechanism for moving upwardly and downwardly the up/down bracket along a shaft, a connecting gear engaging with an intermediary gear of a driven pulley, a pivoting lever disposed at an upper side of the connecting gear and ascending and descending together with the up/down bracket, and an idler gear rotatably mounted on a front end of the pivoting lever and engaging with upper and lower gears of clutches, selectively.

The reel driving apparatus of the present invention uses an existing capstan motor as a power source without requiring a separate power source.

The rotation driving mechanism comprises a hooking protrusion formed at a side edge of a function plate which pushes a protruding member formed at a lower surface of the rotary disk downwardly, thereby rotating the rotary disk at a predetermined angle.

The up/down driving mechanism comprises an engaging protrusion formed at a circumferential surface of the rotary disk, and a recess formed at a circumferential surface of the up/down bracket so as to be engaged with the engaging protrusion of the rotary disk.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
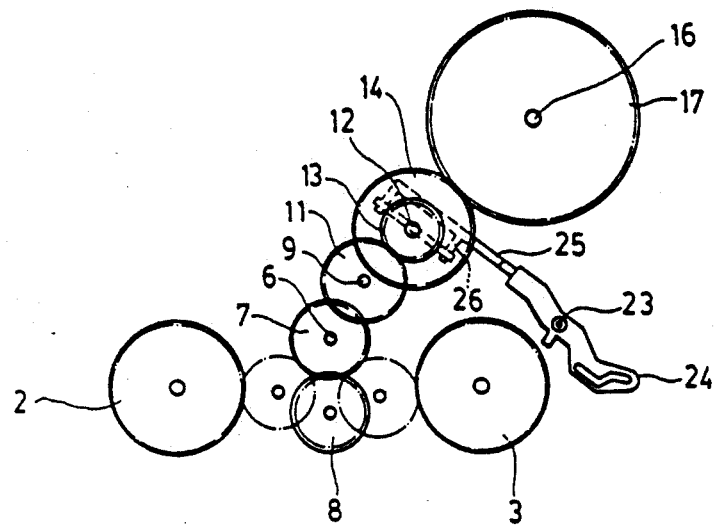
FIG. 1 is a plan view of a conventional reel driving apparatus.
Figure 2:
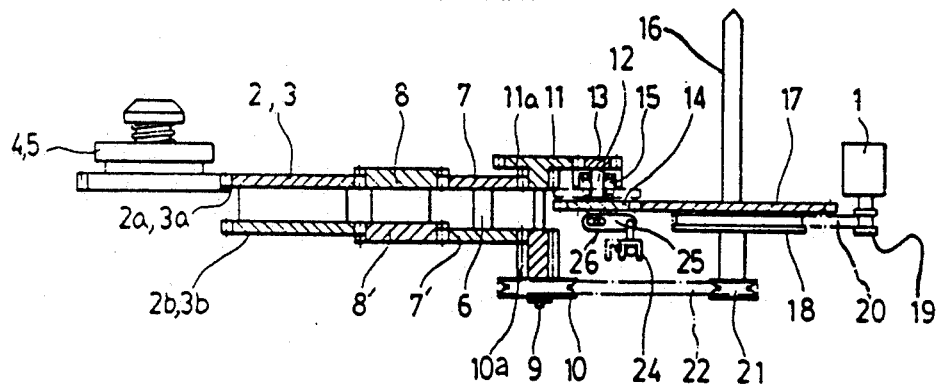
FIG. 2 is a longitudinal sectional view of FIG. 1.
Figure 3:
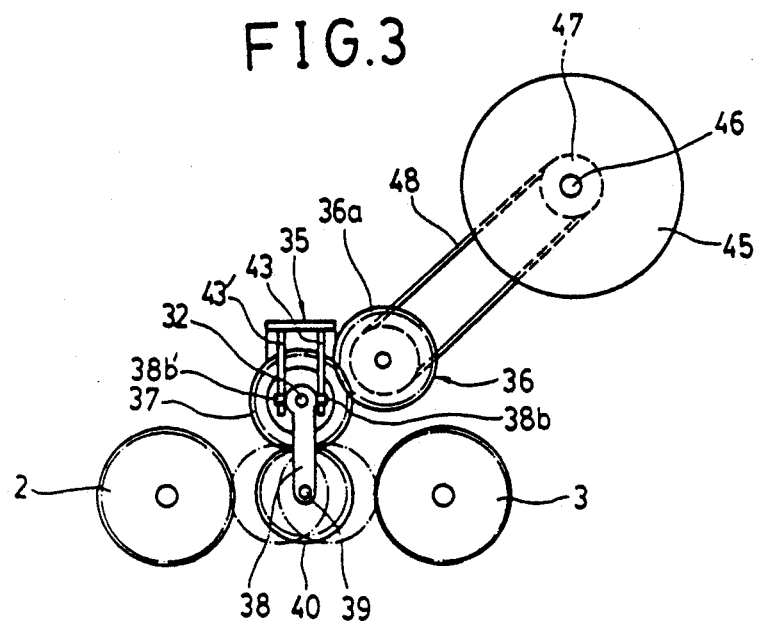
FIG. 3 is a plan view of the reel driving apparatus according to the present invention.

Referring now in detail to the drawings for the purpose of illustrating preferred embodiments of the present invention, the reel driving apparatus for a tape recorder as shown in FIGS. 3 through 6, in which reference numerals 2 and 3 represent a supply reel and a take-up clutches, respectively, 2a, 3a, 2b and 3b are upper and lower gears of the supply and take-up clutches 2 and 3, respectively, 4 and 5 are supply reel and take-up reel, respectively, 30 is a base plate, and 31 is a function plate, comprises a rotary disk 34 rotatably mounted on a central shaft 32 fixed on a base plate 30 and resiliently biased by means of a tensional coil spring 33 and also rotated at a predetermined angle by means of a rotation driving mechanism, an up/down bracket 35 rotatably mounted on the central shaft 32 and movable upward and downward along the central shaft 32 by means of an up/down driving mechanism, a connecting gear 37 rotatably mounted on the central shaft 32 and engaging always with an intermediary gear 36a of a driven pulley 36, a pivoting lever 38 pivotably mounted on the central shaft 32, resiliently biased downwardly by means of an elastic member, and supported with the up/down bracket 35 by means of a supporting member so as to be moved upwardly and downwardly together with the up/down lever 35, an integral-type idler gear 40 rotatably mounted on an end of the pivoting lever 38 by means of a shaft member 39 and engaging selectively with upper and lower gears 2a, 3a, 2b and 3b of the supply and take-up clutches 2 and 3, and a capstan motor 45 for driving the reel driving apparatus of the present invention.

Figure 5:
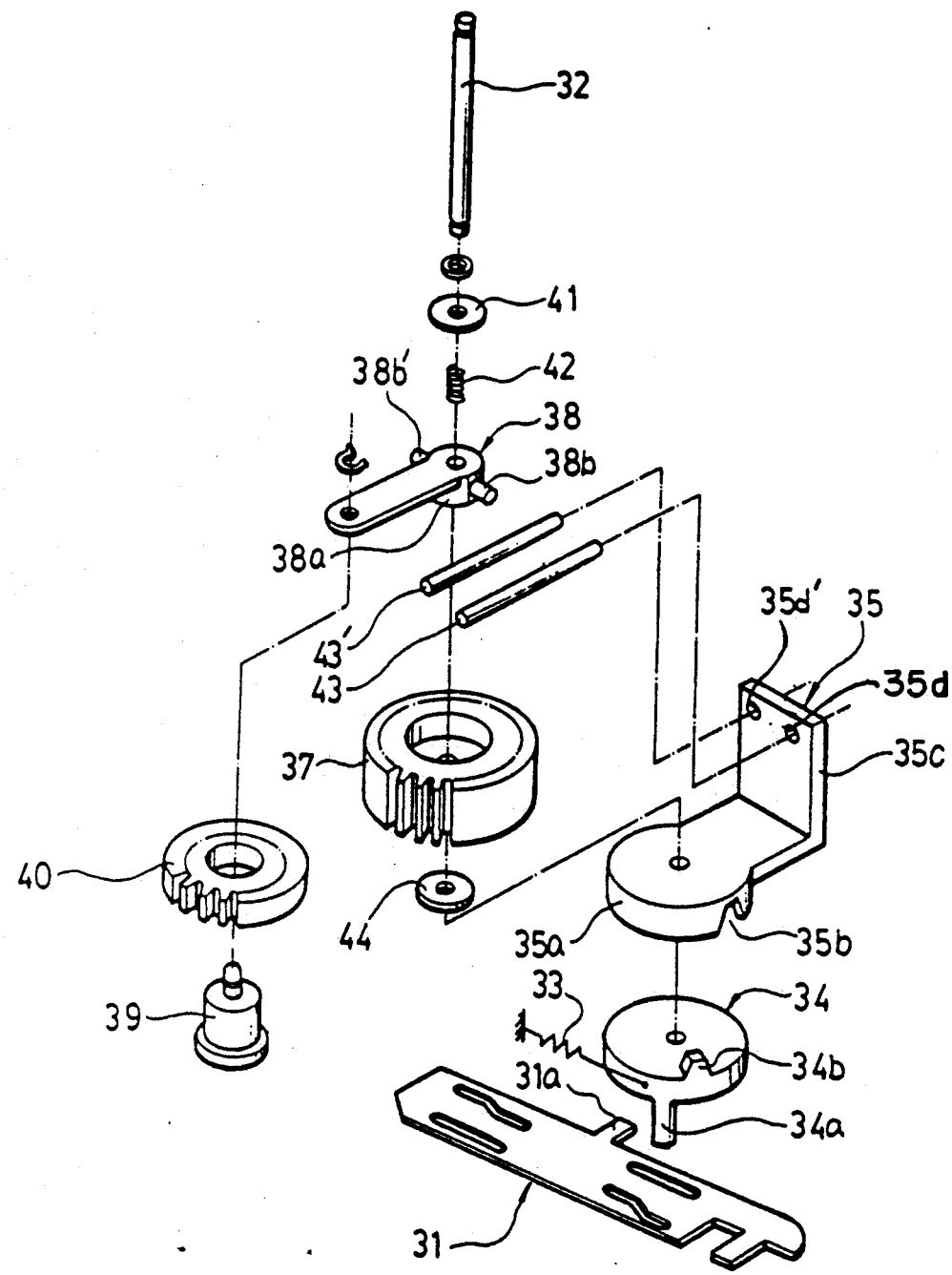
FIG. 5 is a disassembled perspective view of essential parts of the reel driving apparatus according to the present invention.

As can clearly be seen in FIG. 5, the rotation driving mechanism comprises a hooking protrusion 31a formed at one side of the function plate 31 for rotating the rotary disk 34 by pushing a protruding member 34a formed at a lower surface of the rotary disk 34.

The up/down driving mechanism comprises an engaging protrusion 34b formed at a circumferential surface of the rotary disk 34, and a recess 35b formed at a circumferential surface of a circular body 35a of the up/down bracket 35 and engaging with the engaging protrusion 34b of the rotary disk 34.

The elastic member comprises a compressed coil spring 42 disposed between a spring guide piece 41 and the pivoting lever 38 in order to resiliently bias the pivoting lever 38 downwardly.

The supporting member comprises a pair of supporting rods 43 and 43' inserted in fixing holes 35d and 35d' formed at a vertical section 35c of the up/down bracket 35, and a pair of hooking pins 38b and 38b' formed at both side surfaces of the circular body 38a of the pivoting lever 38 and supported by the supporting rods 43 and 43'.

In addition, a washer 44 is disposed in the middle portion of the central shaft 32 so that the connecting gear 37 may be moved upward and downward together with the up/down bracket 35 in case that the up/down bracket 35 is moved upwardly and downwardly by the up/down driving mechanism, while in case that the washer 44 is fixedly mounted on the central shaft 32 in an ordinary manner, the connecting gear 37 is arranged only to rotate in its mounting position irrespective of the up/down movement of the up/down bracket 35 because the washer 44 functions only as a supporting member.

Furthermore, the reel driving apparatus of the present invention utilizes a capstan motor 45 as a power source which is provided with a capstan shaft 46, and at the lower side of the capstan motor 45 a drive pulley 47 is integrally provided which is connected to the driven pulley 36 by means of a belt 48.

Figure 4:
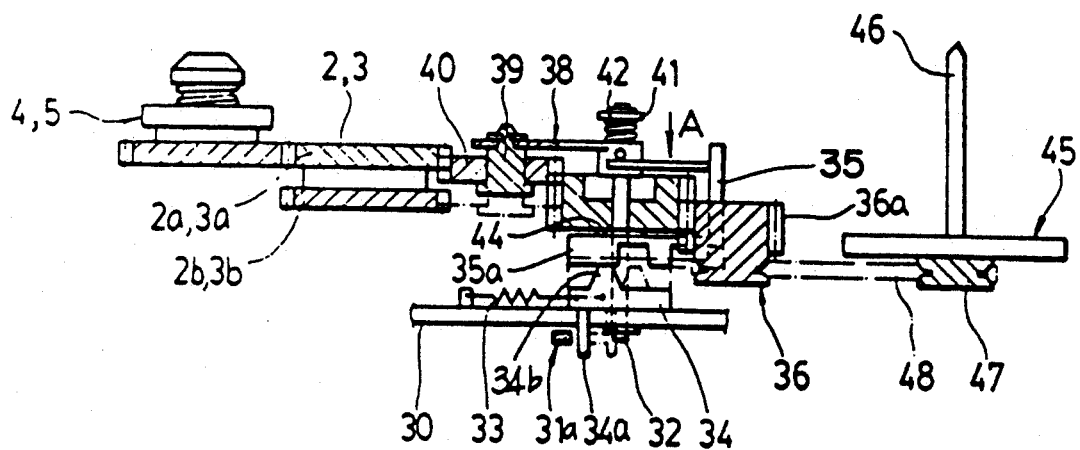
FIG. 4 is a longitudinal sectional view of FIG. 3.
Figure 6A:
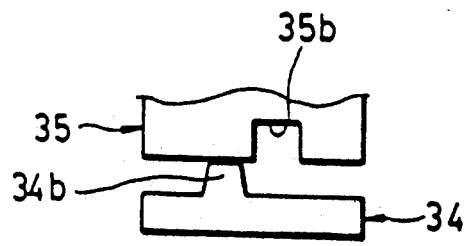
FIGS. 6A and 6B are explanatory views showing the operation of a rotary disk and an up/down bracket according to the present invention.

The reel driving apparatus for use in a tape recorder of the present invention operates as follows:

When a selection key is pressed for a high speed mode such as a FF/REW mode, the rotary disk 34 is pulled to the left by means of the tensional coil spring, as shown in real line in FIG. 4, since the function plate 31 does not move. At this moment, the engaging protrusion 34b of the rotary disk 34 is in contact with the lower surface of the circular body 35a of the up/down bracket 35, as shown in FIG. 4 and FIG. 6A. Accordingly, the pivoting lever 38 of which the hooking pins 38b and 38b' are supported by the supporting rods 43 and 43' of the up/down bracket 35, is maintained in an upwardly moved condition for compressing the compressed coil spring 42.

Under these conditions, the rotational force of the capstan motor 45 is transmitted in a path of drive pulley 47, belt 48, driven pulley 36→intermediary gear 36a→connecting gear 37→idler gear 40, and the idler gear 40 is meshed selectively with upper gears 2a and 3a of the supply and take-up clutches 2 and 3 in accordance with the rotational direction of the connecting gear 37 so that the rotational force of the connecting gear 37 is directly transmitted to the supply and take-up reels 4 and 5 through the supply and take-up clutches 2 and 3, thereby rotating the supply and take-up reels 4 and 5 in a torque suitable for a high speed mode.

Figure 6B:
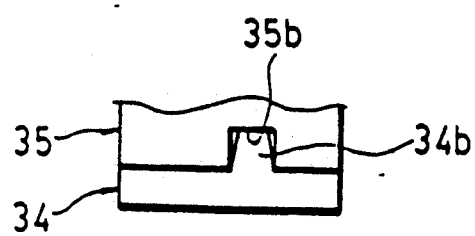

On the other hand, when a selection key for a low speed mode such as a PLAY/UNLOADING mode is pressed, the function plate 31 is moved in the right, as shown in phantom line in FIG. 4, so that the engaging protrusion 31a pushes the protruding member 34a of the rotary disk 34. Accordingly, the rotary disk 34 is rotated at a predetermined angle thereby overcoming the resilient force of the tensional coil spring 33 so that the engaging protrusion 34b of the rotary disk 34 engages with the recess 35b of the up/down bracket 35, as shown in FIG. 6B and at the same time the resilient force of the compressed coil spring 42 which is disposed and compressed between the spring guide piece 41 and the pivoting lever 38 operates downwardly, that is, in the direction of arrow A in FIG. 4, thereby, the pivoting lever 38 of which the hooking pins 38b and 38b' are supported by the supporting rods 43 and 43' is moved downwardly together with the up/down bracket 35. As a result, the idler gear 40 is also moved downwardly, as shown in the phantom line in FIG. 4. Under these conditions, the driving force of the capstan motor 46 is transmitted in the same path as that in the high speed mode to rotate the idler gear 40. And, the idler gear 40 is in meshed with the lower gears 2b and 3b of the supply and take-up clutches 2 and 3, selectively, in accordance with the rotational direction of the connecting gear 37 so that a torque suitable for a low speed mode is transmitted to the supply and take-up reels 4 and 5 through the supply and take-up clutches 2 and 3.

Meanwhile, when the function plate 31 is returned to its original position in a low speed mode, the rotary disk 34 is also returned to its original position by the resilient force of the tensional coil spring 33 so that the engaging protrusion 34b of the rotary disk 34 is released from the recess 35b of the up/down bracket 35, thereby the up/down bracket 35 moves upwardly with overcoming the resilient force of the compressed coil spring 42, as shown in the real line in FIG. 4.

As described above in detail, the present invention provides the effect that it is possible to make simple the construction of the deck mechanism of the tape recorder by using only a single idler mechanism in order to drive the supply reel and take-up reel in different torques suitable for a high speed mode such as a FF/REW mode and a low speed mode such as a PLAY/UNLOADING mode.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A reel driving apparatus for use in a tape recorder, comprising:
   driving means for supplying a driving force to said reel driving apparatus;
   transmitting means for transmitting the driving force of said driving means to an intermediary gear;
   a central shaft fixed on a base plate;
   a function plate, responsive to an external signal, for movement between high speed and low speed function modes;
   a rotary disk rotatably mounted on said central shaft and activated by movement of said function plate;
   an up/down movement member interconnected with said rotary disk and movable up and down along with a capstan shaft in accordance with rotating movement of said rotary disk;
   a connecting gear interlocked with said intermediary gear;
   supporting means for supporting said connecting gear so as to be moved upward and downward together with the up/down movement member;
   elastic means, inserted on the central shaft, for biasing said supporting means downwardly;
   supply and take-up clutches each provided with upper and lower gears, respectively; and
   an idler gear, rotatably mounted on said supporting means and interlocked with the connecting gear, for selectively engaging with said upper and lower gears of the supply and take-up clutches.

2. The apparatus as claimed in claim 1, wherein said rotary disk is provided with a protruding member at its lower surface, and an elastic member resiliently mounted between the rotary disk and a base and wherein the function plate is provided with an engaging protrusion at its side surface.

3. The apparatus as claimed in claim 1, wherein said up/down movement member includes an engaging protrusion formed at an upper surface of the rotary disk and an up/down bracket provided on said up/down movement member with a recess for selectively engaging with said engaging protrusion of the rotary disk in accordance with rotation of the rotary disk.

4. The apparatus as claimed in claim 1, wherein said supporting means includes a pivoting lever having a circular body formed at one end thereof with a plurality of hooking pins and with the connecting gear rotatably mounted on the other end thereof, and a plurality of supporting rods, fixed at an up/down bracket, for supporting said hooking pins.

5. The apparatus as claimed in claim 1, wherein said elastic means includes a compressed coil spring, mounted on the central shaft, for resiliently biasing the pivoting lever downwardly.

6. A reel driving apparatus for use in a tape recorder comprising:

driving means for transmitting a driving force to said reel driving apparatus;

transmitting means for transmitting the driving force of said driving means to an intermediary gear;

a function plate, responsive to an external signal, for movement between high speed and low speed function modes;

a rotary disk rotatably mounted on said central shaft and activated by movement of said function plate;

an up/down movement member interconnected with said rotary disk and movable up and down along with a capstan shaft in accordance with rotating movement of said rotary disk;

a connecting gear interlocked with said intermediary gear;

supporting means for supporting said connecting gear so as to be moved upward and downward together with the up/down movement member;

elastic means, inserted on the central shaft, for biasing said supporting means downwardly;

supply and take-up clutches each provided with upper and lower gears, respectively; and an idler gear, rotatably mounted on said supporting means and interlocked with the connecting gear, for selectively engaging with said upper and lower gears of the supply and take-up clutches;

wherein said rotary disk is provided with a protruding member at its lower surface and an elastic member resiliently mounted between the rotary disk and a base, and wherein the function plate is provided with an engaging protrusion at its side surface.

7. The apparatus as claimed in claim 6, wherein said up/down movement member includes an engaging protrusion formed at an upper surface of the rotary disk and an up/down bracket provided on said up/down movement member with a recess for selectively engaging with said engaging protrusion of said rotary disk in accordance with rotation of the rotary disk.

8. The apparatus as claimed in claim 6, wherein said supporting means includes a pivoting lever having a circular body formed at one end thereof with a plurality of hooking pins and with the connecting gear rotatably mounted on the other end thereof, and a plurality of supporting rods, fixed at an up/down bracket, for supporting said hooking pins.

9. The apparatus as claimed in claim 6, wherein said elastic means includes a compressed coil spring, mounted on the central shaft, for resiliently biasing the pivoting lever downwardly.

* * * * *